United States Patent [19]

Creps

[11] 3,939,654
[45] Feb. 24, 1976

[54] ENGINE WITH DUAL SENSOR CLOSED LOOP FUEL CONTROL

[75] Inventor: Wendell D. Creps, Rochester, Mich.

[73] Assignee: General Motors Corporation, Detroit, Mich.

[22] Filed: Feb. 11, 1975

[21] Appl. No.: 548,969

[52] U.S. Cl. .................................. 60/276; 60/285
[51] Int. Cl.² .......................................... F02B 75/10
[58] Field of Search ...................... 60/276, 285, 286

[56] References Cited
UNITED STATES PATENTS

| | | | |
|---|---|---|---|
| 3,782,347 | 1/1974 | Schmidt | 60/276 |
| 3,815,561 | 6/1974 | Seitz | 60/276 |

Primary Examiner—Douglas Hart
Attorney, Agent, or Firm—Robert M. Sigler

[57] ABSTRACT

In a closed loop fuel control system for an internal combustion engine having a catalytic converter in its exhaust system, a first zirconia sensor in the exhaust system upstream from the catalytic converter generates a signal indicative of air-fuel ratio in gases before catalytic treatment, a second zirconia sensor in the exhaust system downstream from the catalytic converter generates a signal indicative of air-fuel ratio in gases after catalytic treatment and a cascade feedback control system including both zirconia sensors controls the rate of flow of fuel or air to the engine in response to both sensor signals and a reference to maintain a constant stoichiometric air-fuel ratio in the exhaust system for maximum catalytic converter efficiency in simultaneous oxidation and reduction. The engine fuel system reverts to open loop operation during wide open throttle, closed throttle and cold start operation.

6 Claims, 5 Drawing Figures

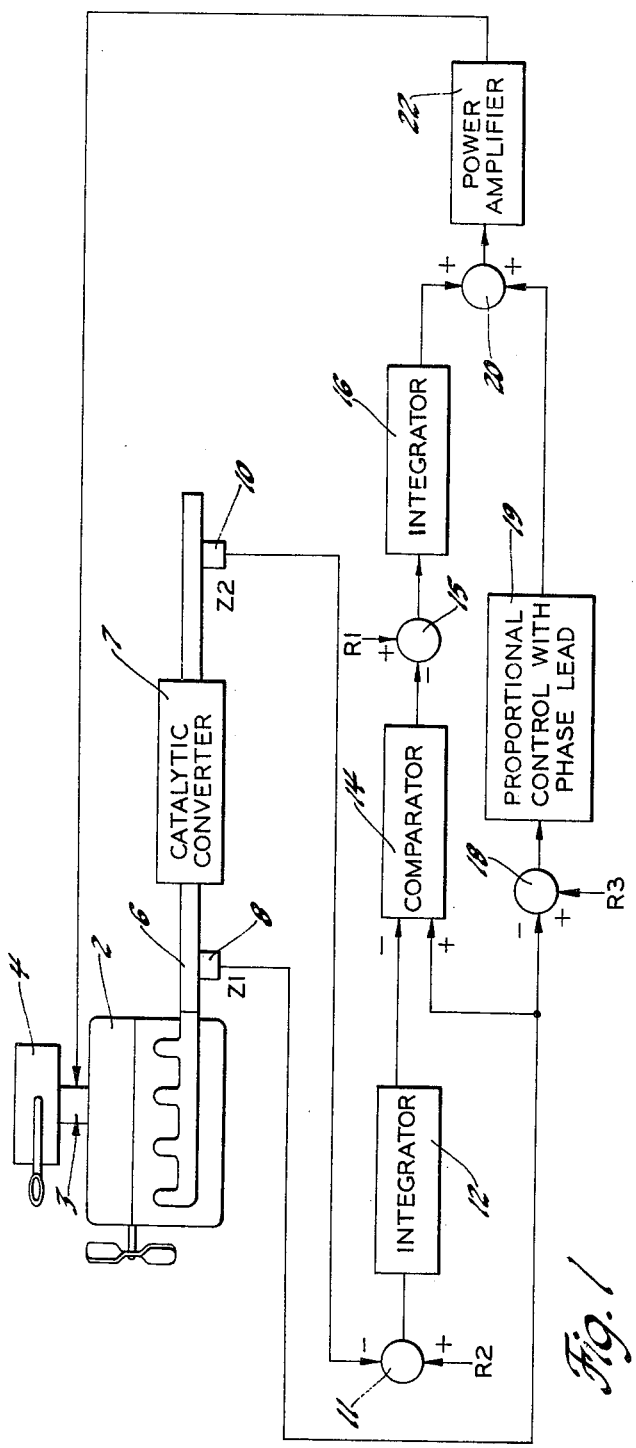
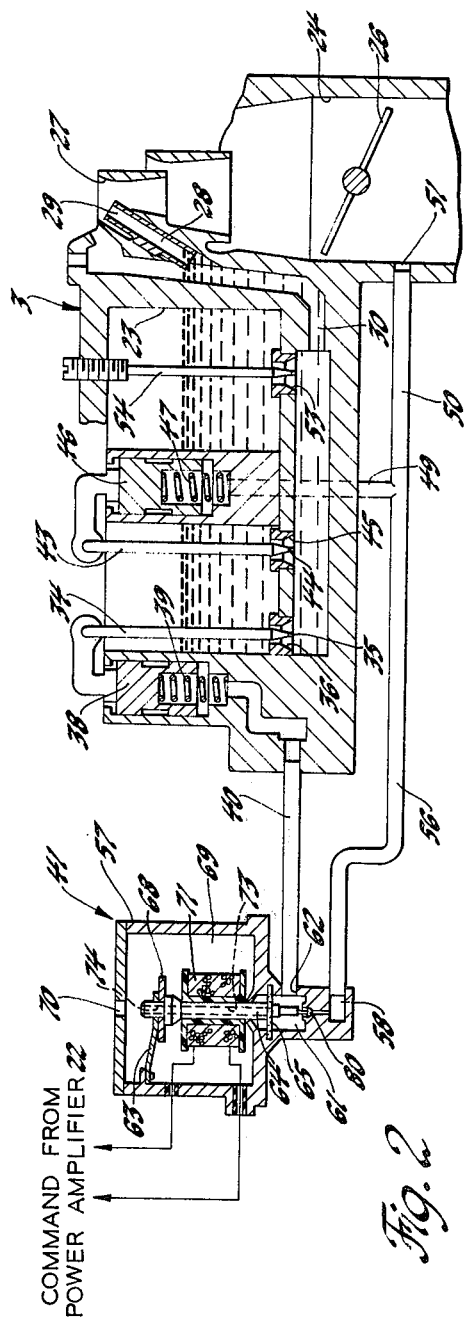

ENGINE WITH DUAL SENSOR CLOSED LOOP FUEL CONTROL

BACKGROUND OF THE INVENTION

This invention is concerned with the reduction of undesirable substances in the exhaust gases of internal combustion engines. It is well known that the types and amounts of substances present in engine exhaust is greatly affected by the ratio of air to fuel in the mixture supplied to the engine. Rich mixtures, with excess fuel, tend to produce higher amounts of hydrocarbons and carbon monoxide; whereas lean mixtures, with excess air, tend to produce greater amounts of oxides of nitrogen. It is well known that exhaust gases can be catalytically treated to reduce the amounts of these undesirable components, the catalytic treatment including oxidation of carbon monoxide and hydrocarbons and reduction of nitrogen oxides.

It has been suggested that both the oxidation and reduction necessary for the minimization of these undesirable exhaust constituents can be achieved with a single catalytic device, provided that the air-fuel mixture supplied to the catalytic converter is maintained within a narrow range at stoichiometry, the ratio containing fuel and oxygen in such proportions that, in perfect combustion, both would be completely consumed. If air-fuel ratio is defined as the amount by weight of air divided by the amount by weight of fuel, there is a narrow range of about 0.05 air-fuel ratio units about stoichiometry in which conversion efficiency is very high for both oxidation and reduction. However, this range, termed the "converter window", is too narrow to be maintained by any conventional open loop fuel control system; and conversion efficiency drops dramatically for the different undesirable exhaust constituents on either side of the window.

Therefore, it has been suggested that a closed loop fuel control system, in which the air-fuel ratio of the mixture supplied to the engine is controlled by a feedback signal from a zirconia sensor exposed to exhaust gases, can maintain the gases supplied to the converter within the converter window. However, the design of such a control system must meet a number of requirements. The system must be stable to maintain continual control and not go into oscillation. On the other hand, the system must be quick reacting and characterized by small overshoot, so that the minimum time is spent outside the converter window. Such a system would desirably be applicable to engines using carburetors as well as those using fuel injection.

A number of closed loop fuel control systems have been proposed, but none are completely satisfactory. Most use a zirconia sensor exposed to engine exhaust upstream from the converter and use proportional or integral control in the feedback loop. Such systems do maintain some control over the engine operating point but tend to drift out of the converter window over time as a result of changing sensor characteristics and other factors.

SUMMARY OF THE INVENTION

This invention is an improved closed loop fuel control system for an internal combustion engine. This system results from the discovery that a second sensor placed downstream from the catalytic converter produces a signal which, when applied to the air-fuel mixing apparatus in combination with the signal from the conventional first sensor results in dependable system operation without drifting out of the catalyst window.

This invention thus comprises a closed loop fuel control system including a pair of zirconia sensors, one upstream and one downstream from the catalytic converter, the signals from which are combined and fed back through appropriate control elements to vary the air-fuel ratio of the engine mixture in order to maintain the air-fuel ratio of the mixture supplied to the catalytic converter within the converter window.

The signals from the sensors complement each other in the sense that each does what the other does not. The second sensor exhibits sharper sensitivity to a change in air-fuel ratio and provides a signal which maintains the system within the converter window over time without drift. The first sensor, on the other hand, provides a quicker response, since it does not involve the time delay introduced by the catalytic converter; and this quicker response reduces transient swings out of the converter window and helps reduce required gain in the feedback loop to improve the stability of the system. The two sensors are particularly adaptable to a cascade control system in which the slower changing signal from the downstream sensor is compared with a first reference used to produce a reference against which the upstream sensor signal is compared to produce a command signal for application to the air-fuel ratio determining means.

The system further provides for automatic assumption of open loop control during engine cold start, wide open throttle and idle operation. Further details and advantages of the invention will be apparent from the accompanying drawings and following description of the preferred embodiment.

SUMMARY OF THE DRAWINGS

FIG. 1 shows a preferred embodiment of a closed loop fuel control system according to this invention in its environment.

FIG. 2 shows means suitable for controlling fuel flow in a carburetor according to an electric signal in the system of FIG. 1.

DESCRIPTION OF THE PREFERRED EMBODIMENT

Figure 3:
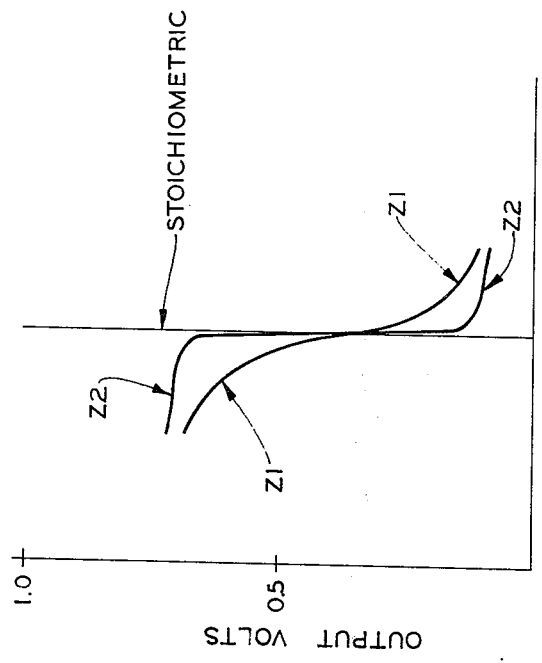
FIG. 3 is an enlarged portion of FIG. 2.

Referring to FIG. 1, an internal combustion engine 2 is supplied with a mixture of fuel and air through appropriate conventional supply means: in this embodiment, a carburetor 3 and air cleaner 4, although it could also be fuel injection or other means.

Engine 2 exhausts its spent gases through an exhaust conduit 6 including a catalytic converter 7. Catalytic converter 7 is a device of the type in which exhaust gases flowing therethrough are exposed to a catalytic substance such as platinum or palladium which, given the proper air-fuel ratio in the exhaust gases, will promote simultaneous oxidation of carbon monoxide and hydrocarbons and reduction of oxides of nitrogen. Exhaust conduit 6 is provided with a first oxygen sensor 8 upstream from catalytic converter 7 and a second oxygen sensor 10 downstream from catalytic converter 7. Oxygen sensors 8 and 10 are preferably of the zirconia electrolyte type which, when exposed to engine exhaust gases at high temperatures, generate an output voltgage which changes appreciably as the air-fuel ratio of the exhaust gases passes through the stoichiometric level. Such sensors are well known in the art, a typical example being that shown in the U.S. Pat. No. 3,844,920 to Burgett et al, dated Oct. 29, 1974. The output voltages of sensors 8 and 10, referred to as Z1 and Z2, respectively, are shown as a function of air-fuel ratio in FIG. 5. It can be seen that Z1 and Z2 have a typical total range of less than one volt, achieve their highest levels with rich mixtures and their lowest levels with lean mixtures, and exhibit a fairly steep slope as the mixture passes through stoichiometry. Not shown in FIG. 5, but well known in the art, is the fact that the upper and lower limit of Z1 and Z2 can vary appreciably with sensor temperature and age.

Figure 5:
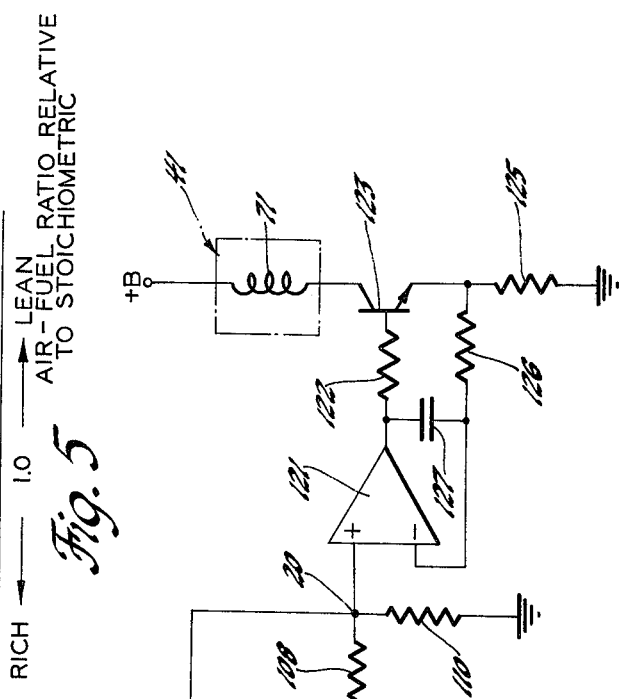
FIG. 5 is a graph showing typical output voltage as a function of air-fuel ratio for pre-converter and post-converter mounted sensors in the system of FIG. 1.

It will also be noted from the curves of FIG. 5 that Z2 exhibits a steeper slope through stoichiometry than does Z1. This sharper voltage transition at the converter window in the downstream sensor is due to the action of the catalytic converter in bringing the exhaust gases to chemical equilibrium. The result is a signal which provides a very accurate indication of the converter window and is also found to be insensitive, in vehicle applications, to driving conditions over a wide range of speeds and loads. In addition, the action of catalytic converter 7 in averaging out individual cylinder firings as well as maldistribution effects that may be present in the exhaust gases proceeding from engine 2 causes signal Z2 to be insensitive to car-to-car or cylinder-to-cylinder variations in mixture distribution. For these reasons, Z2 is the preferred signal for establishing a long term operating point in the engine fuel control system.

Catalytic converter 7, however, introduces a time delay in the sensing of a change in the exhaust gases at sensor 10 compared with the sensing of the same change in the exhaust gases upstream from the catalytic converter, such as would be sensed by sensor 8 and reflected in signal Z1. Although sensor 8 is not as accurate a measure of operation at the converter window as is sensor 10 and might, by itself, allow the operating point to drift from the converter window, it provides a quicker response to changes in the air-fuel ratio within exhaust conduit 6 and thus, used in combination with sensor 10, contributes significantly to the dynamic performance of the system.

The method in which signals Z1 and Z2 are combined is shown in FIG. 1. A summing junction 11 computes the difference between Z2 and a fixed reference R2, which difference is provided to an integrator 12. Reference R2 is set equal to the signal Z2 indicative of the center of the converter window at sensor 10 so that, as long as such a condition exists, the output of integrator 12 will be unchanging. When Z2 varies in either direction from reference R2, the output of integrator 12 will increase or decrease accordingly.

The output of integrator 12 and signal Z1 are fed to the two inputs of a comparator 14, the output of which is a signal which is either a constant high voltage or a constant low voltage, depending on which input is the greater. The difference between the output of comparator 14 and a reference R1 is obtained in summing junction 15. Reference R1 is chosen to be a constant voltage midway between the high and low levels of the output of comparator 14 so that the output of summing junction 15 is a signal whose voltage level always has the same absolute value but varies in sign with the output of comparator 14. Summing junction 15 output is supplied to an integrator 16. The reason that comparator 14, summing junction 15 and reference R1 are used to combine signal Z1 with the output of integrator 12 is to provide a constant integration gain to integrator 16. This is required because changes in the voltage versus air-fuel ratio curve for sensors 8 and 10 due to changing temperatures or sensor age are often of different magnitude on the rich and lean sides of stoichiometric. The signal supplied to integrator 16, which changes in sign only, is insensitive to such non-symmetric changes and thus helps maintain the system at the converter window.

In order to improve stability while maintaining high integrator gain for quick response, it may be desirable to provide the system with a proportional control by signal Z1. To accomplish this, the difference between signal Z1 and a reference R3 is obtained in a summing junction 18 and applied to a proportional control 19, which may also include phase lead elements. The output of proportional control 19 is combined with the output of integrator 16 at a summing junction 20, the output of which controls a power amplifier 22. The output of power amplifier 22 is applied to air-fuel ratio control means associated with carburetor 3.

The air-fuel ratio control means are shown in FIGS. 2 and 3. Carburetor 3, a portion of which is shown in FIG. 2, has a fuel bowl 23 to which fuel is supplied by conventional means. Carburetor 3 has an induction passage 24 with a throttle valve 26, venturi 27 and a fuel supply passage 28 having an upper end 29 open to venturi 27 and a lower end 30 open to fuel bowl 23.

Fuel flowing from fuel bowl 23 to fuel supply passage 28 is controlled by a number of metering jets and rods.

A main metering rod 34 has a tapered end 35 which is movable axially in a main metering jet 36. Main metering rod 34 is positioned by a main vacuum piston 38 and, when lowered against the bias of a spring 39, restricts fuel flow through main jet 36. When spring 39 lifts piston 38, tapered end 35 of main metering rod 34 permits increased fuel flow through main jet 36. Vacuum is supplied to main vacuum piston 38 through a control vacuum conduit 40 from a vacuum regulator 41, to be described at a later point in this application.

An auxiliary metering rod 43 with a tapered end 44 is likewise positioned in an auxiliary metering jet 45 by an auxiliary vacuum piston 46 and a spring 47. One branch 49 of a manifold vacuum conduit 50 connects auxiliary vacuum piston 46 with a manifold vacuum port 51 located below throttle valve 26 in induction passage 24. The application of manifold vacuum through conduit 49 causes piston 46 to move downward against the force of spring 47 and thus move rod 43 to restrict fuel flow through jet 45; a decrease in manifold vacuum causes movement of piston 46 and rod 43 in the opposite direction. Spring 47 is calibrated to allow substantial fuel flow through auxiliary jet 45 only at very low manifold vacuum indicative of wide open throttle.

A supplementary metering jet 53 and supplementary metering rod 54 may also be provided in fuel bowl 23 for calibration or compensation purposes. The carburetor as described is similar to that shown in U.S. patent application Ser. No. 499,332 filed Aug. 21, 1974 by Roland Stewart Taylor and assigned to the assignee of this application.

Another branch 56 of manifold vacuum conduit 50 supplies manifold vacuum to vacuum regulator 41. Vacuum regulator 41 can be any one of a number of devices well known in the art which, when supplied with vacuum which may vary and a variable electric input signal, provides a regulated vacuum signal as an output which varies in accordance with the input electric signal. For purposes of illustration, one such device is shown which is substantially the same as that described in U.S. Pat. No. 3,545,472 issued to Rudolph J. Fronze. It is understood, however, that any number of similar devices known in the art can be substituted for that shown.

Referring to FIGS. 2 and 3, vacuum regulator 41 comprises a casing 57 having a manifold vacuum inlet 58 connected with branch 56 of manifold vacuum conduit 50 and opening through a vacuum inlet port 60 to a vacuum chamber 61. Control vacuum conduit 40 connects with a control vacuum outlet 62 in casing 57, which also opens to vacuum chamber 61.

A valve rod 64 is supported in casing 57 by a spring 63 exerting an upward force thereon and an annular diaphragm 65 having an inner circumference 66 sealingly attached to valve rod 64 and an outer circumference 67 sealingly attached to casing 57, so that diaphragm 65 forms the upper wall of vacuum chamber 61 and the lower wall of a chamber 69 open to the atmosphere through an opening 70.

Rod 64 is provided with a magnetically responsive member 68 near its upper end and is surrounded, within chamber 69 and below member 68, by a fixed coil 71, to which is supplied the output signal from power amplifier 22.

Valve rod 64 has an internal axial passage 73 therethrough having one end 74 open to chamber 69 and another end 75, forming a valve seat 76, open to vacuum chamber 61. A valve member 78, movable in and out of valve seat 76, is attached by a rigid link 79 to another valve member 80 for co-movement therewith, valve member 80 being movable in and out of a valve seat 81 in vacuum inlet port 60.

There exists one axial position of valve rod 64, shown in FIG. 3, for which both valve members 78 and 80 close respective valve seats 76 and 81. As valve rod 64 is moved upward from this position, valve member 80 is moved away from valve seat 81 to allow more manifold vacuum from inlet 58 into vacuum chamber 61. As valve rod 64 moves in the opposite direction, valve seat 76 pulls away from valve member 78 to allow air at atmospheric pressure into vacuum chamber 61. Valve rod 64 coacts with diaphragm 65 and coil 71 to assume a position in which the downward forces on rod 64 due to the difference between atmospheric pressure in chamber 69 and the lower pressure in vacuum chamber 61 and the electromagnetic force on member 68 due to the level of current flow through coil 71 are balanced against the upward force thereon due to spring 63. Thus the vacuum signal obtained from control vacuum outlet 62 is set by the current input to coil 71 and maintained at that level, over all levels of manifold vacuum greater than the desired level of control vacuum, by an internal feedback control comprising the diaphragm 65 and valve members 78 and 80.

In operation, while engine 2 is operating and sensors 8 and 10 are warmed up to operating temperature, signals Z1 and Z2, which are indicative of the air-fuel ratios seen by sensors 8 and 10, are combined in elements numbered 11 through 22 in the manner previously described to produce an electric current which is converted to a vacuum analog signal in vacuum regulator 41 and applied to main vacuum piston 38 to vary the position of main metering rod 34. The polarities of the connections are such that a high current output from power amplifier 22 produces a low vacuum output from vacuum regulator 41, which, in turn, allows metering rod 34 to move upward and open main jet 36. Decreasing current output from power amplifier 22, on the other hand, produces an increasing control vacuum applied to piston 38, which pulls main metering rod 34 downward to close metering jet 36 and supply a leaner air-fuel mixture to engine 2.

During wide open throttle operation, it is generally desired that the air-fuel mixture be allowed to go richer than normal for maximum power. As previously mentioned, metering rod 43 and jet 45 are supplied to allow the air-fuel mixture to become more rich when the loss of manifold vacuum signals wide open throttle operation. In addition, since a rich mixture is desired, it is desirable to suspend closed loop control, which would otherwise attempt to bring the air-fuel ratio back to the converter window. This is accomplished in this embodiment automatically, since the loss of manifold vacuum indicative of wide open throttle operation results in a loss of control vacuum applied to piston 38, which allows main jet 36 to open completely, regardless of the electrical signal output of power amplifier 22. In other embodiments, such as fuel injection, in which manifold vacuum is not used in the control loop, a switch actuated by a wide open throttle could supply an electric signal to power amplifier 22 to override the input signal thereto from summing junction 20 and command the desired output signal to allow the mixture to go rich.

Figure 4:
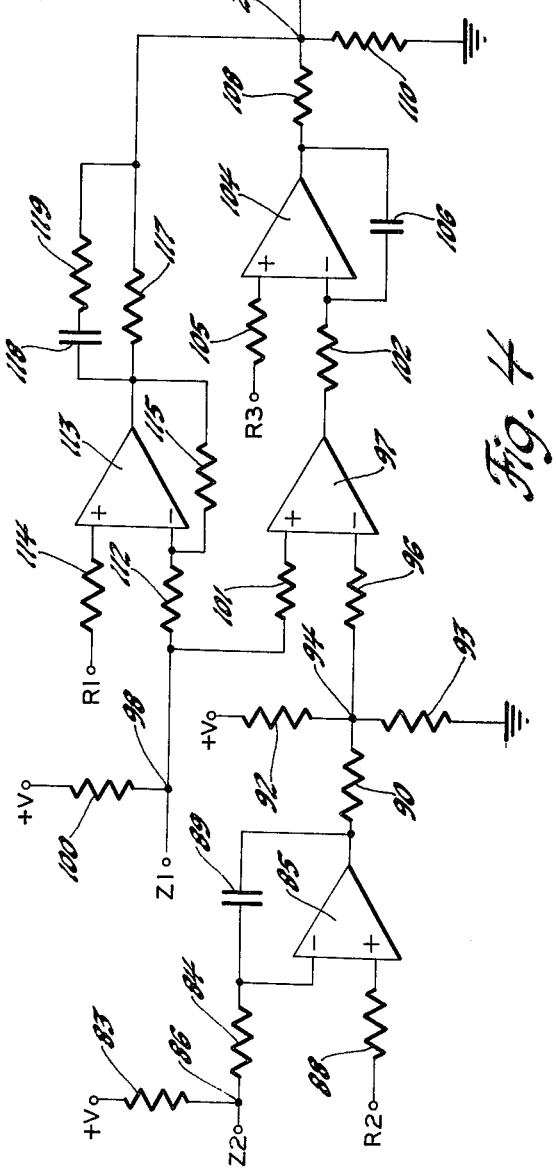
FIG. 4 is an electric circuit for use in the system of FIG. 1.

FIG. 4 shows a preferred embodiment in circuit form of the control logic described in elements 11 through 22 of FIG. 1. A regulated power source, not shown, supplies current at a regulated voltage V through series resistors 83 and 84 to the negative input of an operational amplifier 85. Signal Z2 is applied to the junction 86 between resistors 83 and 84; and the constant reference voltage R2, generated in means not shown, is applied through a resistor 88 to the positive input of operational amplifier 85. The output of operational amplifier 85 is fed back through a capacitor 89 to the negative input of operational amplifier 85 and through a scaling network comprising resistors 90, 92 and 93 having one end of each connected to a junction 94 and the other end of each connected, respectively, to the output of operational amplifier 85, regulated voltage V and ground. Junction 94 is connected through a resistor 96 to the negative input of a comparator 97.

Signal Z1 is applied to the junction 98 of a resistor 100, the other of which is connected to regulator voltage V, and a resistor 101, the other end of which is connected to the positive input of comparator 97.

The output of comparator 97, which carries a low or high voltage, depending on the inputs, is connected through a resistor 102 to the negative input of operational amplifier 104. A reference voltage R3 is applied through a resistor 105 to the positive input of operational amplifier 104; and a capacitor 106 provides feedback from the output to the negative input of operational amplifier 104. Reference voltage R3 is generated by common means not shown and, as previously stated, is set at a level midway between the low and high voltage outputs of comparator 97 so that the signal which is integrated, the difference between the positive and negative input voltages of operational amplifier 104, has a constant absolute value of one-half the difference between the high and low voltage output signals of comparator 97 and a sign which changes between positive and negative as the output of comparator 97 changes. Elements 102 through 106, just described, correspond to elements 15 and 16 of FIG. 1. The output of operational amplifier 104 is connected through a resistor 108 to summing junction 20, which is also connected through a resistor 110 to ground.

Signal Z1 is also applied through a resistor 112 to the negative input of an operational amplifier 113. A reference voltage R1, generated by normal means not shown, is applied through a resistor 114 to the positive input of operational amplifier 113; and a resistor 115 provides feedback from the output to the negative input of operational amplifier 113. Reference voltage R1 is selected to produce a null output from operational amplifier 113 when Z1 assumes a value corresponding to the center of the converter window. Operational amplifier 113 with resistive feedback in the inputs as shown provides a proportional control on Z1.

The output of operational amplifier 113 is connected through a resistor 117 and, in parallel therewith, a series capacitor 118 and resistor 119 to summing junction 20. These elements provide the input resistence to summing junction 20 and introduce phase lead into the proportional channel of which they are a part.

Summing junction 20 is connected to the positive input of an operational amplifier 121, the output of which is connected through a resistor 122 to the base of a power transistor 123, the collector of which is connectd through coil 71 of vacuum regulator 41 to a source of current, not shown, at an unregulated voltage B, which could be the standard vehicle battery or alternator. The emitter of transistor 123 is connected through a resistor 125 to ground and a resistor 126 to the negative input of operational amplifier 121. Power transistor 123 may be one or more transistors in combination such as a Darlington pair, whatever combination is required to handle the driving current through coil 71. A capacitor 127 is provided connecting the output to the negative input of operational amplifier 121.

Elements 121 through 127 comprise a current source for providing a regulated output current from the collector of transistor 123 which varies in accordance with the voltage at summing junction 20. Regulation of the current output is required to make it insensitive to temperature related changes in the resistance of coil 71 and changes in unregulated voltage B. Capacitor 127 is included to damp out oscillations.

In the operation of the system, zirconia sensors such as 8 and 10 do not produce a usable output signal until they are warmed by the exhaust gases to a minimum operating temperature in the general vicinity of 800° F. Thus, on cold start operation, an open loop command must be supplied for the system. Resistors 83 and 100, previously described, are effective when sensors 8 and 10 are below operating temperature to supply biasing voltages in place of Z2 and Z1 to the negative inputs of operational amplifiers 85 and 113 respectively. The values of resistors 83 and 100 are selected to produce biasing voltages to drive the system to full lean, so that the actual engine air-fuel ratio may be controlled by a choke or other standard mechanism separate from the system.

Open loop control may also be desired during closed throttle operation. An electric signal from a closed throttle operated switch that turns off power amplifier 22 will cause the main jet 36 to close to its lean limit and allow the standard idle jets to determine idle air-fuel ratio.

The embodiment of my invention as described is not the only possible embodiment thereof. Many equivalent embodiments will occur to those having skill in the art; and my invention should therefore be limited only by the claims which follow.

The embodiments of the invention in which an exclusive property or privilege is claimed are defined as follows:

1. For use with an internal combustion engine including means for supplying air and fuel thereto in variable ratio and exhaust means including a catalytic converter effective, when supplied with exhaust gases containing air and fuel in a certain ratio, to accelerate simultaneously the oxidation of unburned fuel and the reduction of nitrogen oxides and characterized by time delay effects when the content of the gas introduced therein is varied, apparatus for controlling the ratio of air and fuel in said exhaust system to said certain ratio, said apparatus comprising:

means for generating a first signal indicative of the air-fuel ratio within said exhaust means upstream from said catalytic converter, said first signal generating means being characterized by time-related drift in closed cycle control operation;

means for generating a second signal indicative of the air-fuel ratio within said exhaust means downstream from said catalytic converter, said second signal generating means being characterized by catalytic converter-related, time-delayed response in relation to said first signal generating means; and means for continually adjusting said fuel and air supply means to vary the ratio of fuel and air supplied to said engine in response to the direction of the deviation of said first signal from the time integral of the extent the second signal deviates from a fixed reference, said adjustment being in sense to reduce the deviation of the ratio of fuel and air in the exhaust means from said certain ratio.

2. For use with an internal combustion engine including means for supplying air and fuel thereto in variable ratio and exhaust means including a catalytic converter effective, when supplied with exhaust gases containing air and fuel in a certain ratio, to accelerate simultaneously the oxidation of unburned fuel and the reduction of nitrogen oxides and characterized by time delay effects when the content of the gas introduced therein is varied, apparatus for controlling the ratio of air and fuel in said exhaust system to said certain ratio, said apparatus comprising:

means for generating a first signal indicative of the air-fuel ratio within said exhaust means upstream from said catalytic converter, said first signal generating means being characterized by time-related drift in closed cycle control operation;

means for generating a second signal indicative of the air-fuel ratio within said exhaust means downstream from said catalytic converter, said second signal generating means being characterized by catalytic converter-related time-delayed response in relation to said first signal generating means;

means responsive to the second signal to generate a third signal varying with the time integral of said second signal;

means responsive to the first and third signal to generate a fourth signal having one value when the first signal exceeds the third signal and another value when a third signal exceeds the first signal; and means responsive to the fourth signal to continuously adjust the ratio of air and fuel supplied to the engine in a direction to reduce the difference between the ratio of air and fuel in the exhaust means and said certain ratio.

3. For use with an internal combustion engine including means for supplying air and fuel thereto in variable ratio and exhaust means including a catalytic converter effective, when supplied with exhaust gases containing air and fuel in a certain ratio, to accelerate simultaneously the oxidation of unburned fuel and the reduction of nitrogen oxides and characterized by time delay effects when the content of the gas introduced therein is varied, apparatus for controlling the ratio of air and fuel in said exhaust system to said certain ratio, said apparatus comprising:

means for generating a first signal indicative of the air-fuel ratio within said exhaust means upstream from said catalytic converter, said first signal generating means being characterized by time-related drift in closed cycle control operation;

means for generating a second signal indicative of the air-fuel ratio within said exhaust means downstream from said catalytic converter, said second signal generating means being characterized by catalytic converter-related time-delayed response in relation to said first signal generating means;

a first integrator responsive to the second signal and effective to generate a third signal varying with the time integral of the second signal;

a comparator responsive to the first and third signals and effective to generate a fourth signal having a first value when the first signal exceeds the third signal and a second value when a third signal exceeds the first signal;

a second integrator responsive to the fourth signal and effective to generate a fifth signal varying as the time integral of the fourth signal; and means responsive to the fifth signal for continuously adjusting the ratio of air and fuel supplied to the engine in extent and direction to reduce the deviation between the ratio of air and fuel in the exhaust means as sensed by either sensor and said certain ratio.

4. For use with an internal combustion engine including means for supplying air and fuel thereto in variable ratio and exhaust means including a catalytic converter effective, when supplied with exhaust gases containing air and fuel in a certain ratio, to accelerate simultaneously the oxidation of unburned fuel and the reduction of nitrogen oxides and characterized by time delay effects when the content of the gas introduced therein is varied, apparatus for controlling the ratio of air and fuel in said exhaust system to said certain ratio, said apparatus comprising:

a first zirconia sensor effective to generate a first signal indicative of the deviation of the air-fuel ratio from said certain ratio within said exhaust means upstream from said catalytic converter, said first zirconia sensor being characterized by time-rated drift in closed loop control operation;

a second zirconia sensor effective to generate a second signal indicative of the deviation of the air-fuel ratio from said certain ratio with said exhaust means downstream from said catalytic converter, said second zirconia sensor being characterized by catalytic converter-related, time-delayed response in relation to said first signal generating means;

a first integrator responsive to the second signal and effective to generate a third signal varying with the time integral of the second signal;

a comparator responsive to the first and third signals and effective to generate a fourth signal having a first value when the first signal exceeds the third signal and a second value when a third signal exceeds the first signal;

a second integrator responsive to the fourth signal and effective to integrate with respect to time at a constant rate in one direction when the fourth signal has its first value and in the other direction when the fourth signal has its second value and produce thereby a fifth signal;

means responsive to the first signal to generate a sixth signal varying with the first signal and having phase lead with respect to said fifth signal; and means responsive to the fifth and sixth signals to continuously adjust the ratio of air and fuel supplied to the engine in extent and direction to reduce the difference between the air-fuel ratio of gases in the exhaust means and the certain ratio.

5. A power plant for a vehicle comprising, in combination:

a combustion engine;

means for supplying air and fuel to the engine in variable ratio;

means for conducting exhaust gases from the engine, said means including a catalytic converter effective, when supplied with exhaust gases containing air and fuel in a certain ratio, to simultaneously oxidize hydrocarbons and carbon monoxide and reduce oxides of nitrogen, the catalytic converter further being effective, when the exhaust gases supplied thereto exhibit a change in air-fuel ratio, to delay the appearance of a corresponding change in the gases emitted therefrom;

a first sensor in the exhaust conduit between the engine and catalytic converter, the first sensor generating a first signal varying inversely with air-fuel ratio of the exhaust gases emitted from the engine, said first signal being characterized by time and temperature related drift;

a second sensor in the exhaust conduit on the far side of the catalytic converter from the engine, the second sensor generating a second signal varying inversely with the air-fuel ratio of the exhaust gases emitted from the catalytic converter; said second signal being characterized by catalytic converter-related delayed response, compared with the first signal, to changes in exhaust gas air-fuel ratio;

a first integrator responsive to the second signal and effective to generate an output signal varying with the time integral thereof;

a comparator responsive to the first signal and the first integrator output signal and effective to generate an output signal having a fixed absolute value with a first sign when the first signal exceeds the first integrator output signal and a second sign when the first integrator output signal exceeds the first signal;

a second integrator responsive to the comparator output signal to generate an output signal varying with the time integral of the comparator output signal;

a proportional amplifier responsive to the first signal and effective to generate an output signal varying directly with the first signal;

means responsive to the sum of the second integrator output signal and the proportional amplifier output signal to control the air-fuel supply means and vary the ratio of air and fuel supplied to the engine in extent and direction to simultaneously reduce the deviations from said certain ratio of the air-fuel ratio of gases in the exhaust conduit both supplied to and emitted from the catalytic converter.

6. For use with a combustion engine including means for supplying air and fuel and exhaust means for transporting exhaust gases containing oxidizing and reducing agents in ratio determined by said supply means, said exhaust means including a catalytic converter effective, when supplied with exhaust gases containing oxidizing and reducing agents in a certain ratio, to accelerate certain reactions between said oxidizing and reducing agents and characterized by time delay effects when the content of the exhaust gases supplied thereto is varied, apparatus for controlling the ratio of oxidizing and reducing agents in said exhaust means to said certain ratio, said apparatus comprising:

means for generating a first signal indicative of the portion of one of said agents in said exhaust means upstream from said catalytic converter, said first signal generating means being characterized by time-related drift in closed cycle control operation;

means for generating a second signal indicative of the portion of said one agent in said exhaust means downstream from said catalytic converter, said second signal generating means being characterized by catalytic converter-related, time-delayed response in relation to said first signal generating means; and means for continually adjusting said fuel and air supply means to vary the ratio of oxidizing and reducing agents in said exhaust gases in response to the direction of the deviation of said first signal from the time integral of the extent the second signal deviates from a fixed reference, said adjustment being in sense to reduce the deviation of the ratio of oxidizing and reducing agents in the exhaust means from said certain ratio.

* * * * *